(12) United States Patent
Warkentin et al.

(10) Patent No.: US 11,803,304 B2
(45) Date of Patent: Oct. 31, 2023

(54) EFFICIENT BIT COMPRESSION FOR DIRECT MAPPING OF PHYSICAL MEMORY ADDRESSES

(71) Applicant: VMware, Inc., Palo Alto, CA (US)

(72) Inventors: Andrei Warkentin, South Elgin, IL (US); Sunil Kotian, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 129 days.

(21) Appl. No.: 17/578,680

(22) Filed: Jan. 19, 2022

(65) Prior Publication Data

US 2023/0229307 A1 Jul. 20, 2023

(51) Int. Cl.
*G06F 12/06* (2006.01)
*G06F 3/06* (2006.01)
*G06F 9/455* (2018.01)

(52) U.S. Cl.
CPC .......... *G06F 3/0608* (2013.01); *G06F 3/0655* (2013.01); *G06F 3/0679* (2013.01); *G06F 9/45558* (2013.01); *G06F 2009/45583* (2013.01)

(58) Field of Classification Search
CPC ...... G06F 3/0608; G06F 3/0638; G06F 3/064; G06F 3/0641; G06F 3/0644; G06F 3/0655; G06F 9/45558; G06F 2009/45583; G06F 12/0284; G06F 12/0292
USPC ................................. 711/202–210
See application file for complete search history.

(56) References Cited

U.S. PATENT DOCUMENTS

| | | | | |
|---|---|---|---|---|
| 2012/0272037 A1* | 10/2012 | Bayer | ................. | G06F 13/4282 711/E12.078 |
| 2014/0372726 A1* | 12/2014 | Koo | ....................... | G06F 12/10 711/206 |
| 2015/0186279 A1* | 7/2015 | Dong | .................. | G06F 12/0873 711/135 |
| 2017/0255565 A1* | 9/2017 | Mosiolek | ............ | G06F 12/0238 |
| 2017/0262377 A1* | 9/2017 | Yoshii | ................... | G06F 3/0659 |

* cited by examiner

*Primary Examiner* — Ilwoo Park
(74) *Attorney, Agent, or Firm* — Thomas Horstemeyer, LLP (57) ABSTRACT

Disclosed are various examples of providing efficient bit compression for direct mapping of physical memory addresses. In some examples, a hypervisor operating system component generates a mask of used address space bits indicated by memory map entries for a computing device. A longest range of unused address space bits is identified using the mask. The memory map entries are transformed to omit the longest range of unused address space bits.

20 Claims, 3 Drawing Sheets

EFFICIENT BIT COMPRESSION FOR DIRECT MAPPING OF PHYSICAL MEMORY ADDRESSES

BACKGROUND

Address mapping between physical addresses and virtual addresses can enable virtualization solutions to accurately access physical memory. In some solutions, direct mapping can include mapping physical memory in relation to a certain virtual address offset. Memory mapping agents or facilities can have constraints on kernel address space. Memory mapping agents can utilize a memory size constraint such as a predetermined number of terabytes or another measure of memory.

While a particular memory constraint can be acceptable for some systems, the same constraint can be unacceptable in other system architectures. For example, some architectures can have random access memory (RAM) start at address 0, and can be generally contiguous. If there are gaps or memory holes, the locations can be fairly regular, and the gaps or holes that do exist can be relatively small. However, other system architectures can place RAM at various locations that can include multiple and tens-of-terabyte offsets, which can outrun the predetermined memory constraint or total memory area of some memory mapping agents.

While some solutions to this issue can involve multiple mapping regions and some method of forwarding indexing into the correct region, this can result in relatively high overhead, whereas these mapping facilities should remain low-overhead both in terms of memory overhead and access overhead. As a result, there is a need for better and more efficient mapping solutions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing efficient bit compression for direct mapping of physical memory addresses. Address mapping between physical addresses and virtual addresses can enable virtualization solutions to accurately access physical memory. In some solutions, direct mapping can include mapping physical memory in relation to a certain virtual address offset. Memory mapping agents or facilities can have constraints on kernel address space. Memory mapping agents can utilize a memory size constraint such as a predetermined number of terabytes or another measure of memory.

While a particular memory constraint can be acceptable for some systems, the same constraint can be unacceptable in other system architectures. For example, some architectures can have random access memory (RAM) start at address 0, and can be generally contiguous. If there are gaps or memory holes, the locations can be fairly regular, and the gaps or holes that do exist can be relatively small. However, other system architectures can place RAM at various locations that can include multiple and tens-of-terabyte offsets, which can outrun the predetermined memory constraint or total memory area of some memory mapping agents.

While some solutions to this issue can involve multiple mapping regions and some method of forwarding indexing into the correct region, this can result in relatively high overhead, whereas these mapping facilities should remain low-overhead both in terms of memory overhead and access overhead. As a result, there is a need for better and more efficient mapping solutions. The present disclosure provides mechanisms that can provide efficient bit compression that maintains a one-to-one mapping of virtual memory to physical memory.

Figure 1:
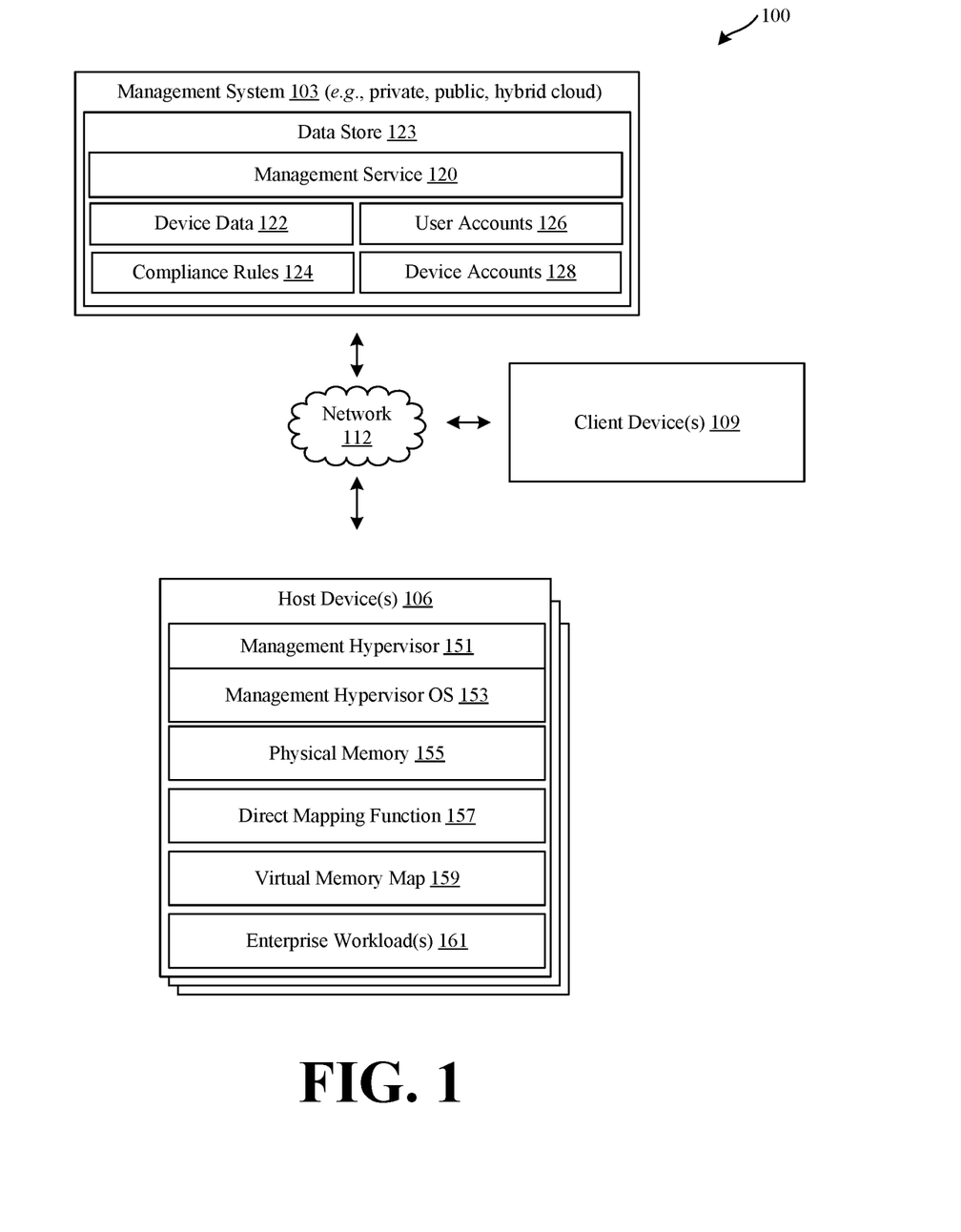
FIG. 1 is a drawing of an example of a networked environment that includes components that provide efficient bit compression for direct mapping of physical memory addresses, according to the present disclosure.

With reference to FIG. 1, shown is an example of a networked environment 100. The networked environment 100 can include a management system 103, host devices 106, and other components in communication with one another over a network 112. In some cases, host devices 106 can include host computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Virtual memory, virtual processors, virtual data storage, and virtual network resources of a virtual machine can be mapped to physical memory, physical processors, physical data storage, and physical network resources. The virtual machines can be used to execute workloads including the enterprise workloads 161. The enterprise workloads 161 can be workloads that are managed by the management service 120 for an enterprise that employs the management service 120. Some enterprise workloads 161 can be initiated and accessed by enterprise users through client devices 109.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of management systems 103 that are arranged in one or more server banks, computer banks, or other arrangements. The management system 103 can include a grid computing resource or any other distributed computing arrangement. The management system 103 can be multi-tenant, providing virtualization and management of enterprise workloads 161 for multiple different enterprises. Alternatively, the management system 103 can be customer or enterprise-specific.

The computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of cloud-based management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data provided by the host devices 106 and can be accessed using client devices 109 that can be enrolled in association with a user account 126 and related credentials.

The management service 120 can communicate with associated management instructions executed by host devices 106, client devices 109, edge devices, and IoT devices to ensure that these devices comply with their respective compliance rules 124, whether the specific host device 106 is used for computational or access purposes. If the host devices 106 or client devices 109 fail to comply with the compliance rules 124, the respective management instructions can perform remedial actions including discontinuing access to and processing of enterprise workloads 161.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an interne protocol (IP) address, or another identifier that uniquely identifies a device with respect to other devices.

The device data 122 can include an enrollment status indicating whether each client device 109 is enrolled with or managed by the management service 120. For example, an end-user device, an edge device, an IoT device, or other client device 109 can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, and other client devices 109. While a user account 126 can be associated with a particular person as well as client devices 109, a device account 128 can be unassociated with any particular person, and can nevertheless be utilized for an IoT device, edge device, or another client device 109 that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for host devices 106 to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules can also be determined based on a user account 126 associated with a user.

Compliance rules 124 can include predefined constraints that must be met in order for the management service 120, or other applications, to permit host devices 106 access to enterprise data and other functions of the management service 120. The management service 120 can communicate with management instructions on the client device 109 to determine whether states exist on the client device 109 which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices 109 or other vulnerability, as can be appreciated. While the client devices 109 are generally discussed as devices that access enterprise workloads 161 that are hosted by the host devices 106, all types of client devices 109 discussed can also execute virtualization components and provide hardware used to host enterprise workloads 161. In other words, a client device 109 can be utilized as a host device 106.

The management service 120 can oversee the management and resource scheduling using hardware provided using host devices 106. The management service 120 can transmit various software components, including enterprise workloads, enterprise data, and other enterprise resources for processing and storage using the various host devices 106. The host devices 106 can include host devices such as a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations local and/or remote from the other components.

The host devices 106 can have locally connected accelerator devices. The accelerator devices can be connected to the edge device through a universal serial bus (USB) connection, a Peripheral Component Interconnect Express (PCI-e) or mini-PCI-e connection, or another physical connection. Accelerator devices can include a hardware accelerator specialized to perform artificial neural networks, machine vision, machine learning, and other types of special purpose instructions written using CUDA, OpenCL, C++, and other instructions. The accelerator devices can utilize in-memory processing, low-precision arithmetic, and other types of techniques. The accelerator devices can include a physical memory 155 that can be mapped as discussed in further detail below.

The management service 120 can include a scheduling service that monitors resource usage of the host devices 106, and particularly the host devices 106 that execute enterprise workloads. This can include resource usage of accelerator devices that are installed on the host devices 106. While the management service 120 can schedule enterprise workloads on any host device 106 or client device 109 that includes virtualization components such as the management hypervisor 151 and the management hypervisor operating system 153.

The host device 106 can include a management hypervisor 151 that includes a management hypervisor operating system 153. The management hypervisor 151 can communicate with the management service 120 for scheduling of enterprise workloads 161 executed using virtual resources that are mapped to the physical resources of one or more host device 106. The physical resources of the host device 106 can include a physical memory 155.

The management hypervisor operating system 153 can provide a kernel that acts as the liaison between virtual machines and the physical hardware of the host devices 106. The management hypervisor operating system 153 can be responsible for allocating memory, scheduling CPUs, and initializing other hardware abstraction and operating system (OS) services for the management hypervisor 151.

The management hypervisor operating system 153 can include a component that utilizes a direct mapping function 157 to map virtual memory of a virtual machine to the physical memory 155 of a host device 106. The management hypervisor operating system 153 can include a component that performs bit compression to generate transformed memory map entries to fit within a memory size constraint of a virtual memory map 159 of the direct mapping function 157. In other words, the direct mapping function 157 can include and/or generate a virtual memory map 159 that has a predetermined memory size limit or constraint, such as 64 terabytes, 128 terabytes, or another predetermined memory size. The predetermined memory size can be a constraint that is in place as a result of kernel address space of the management hypervisor operating system 153.

Figure 2:
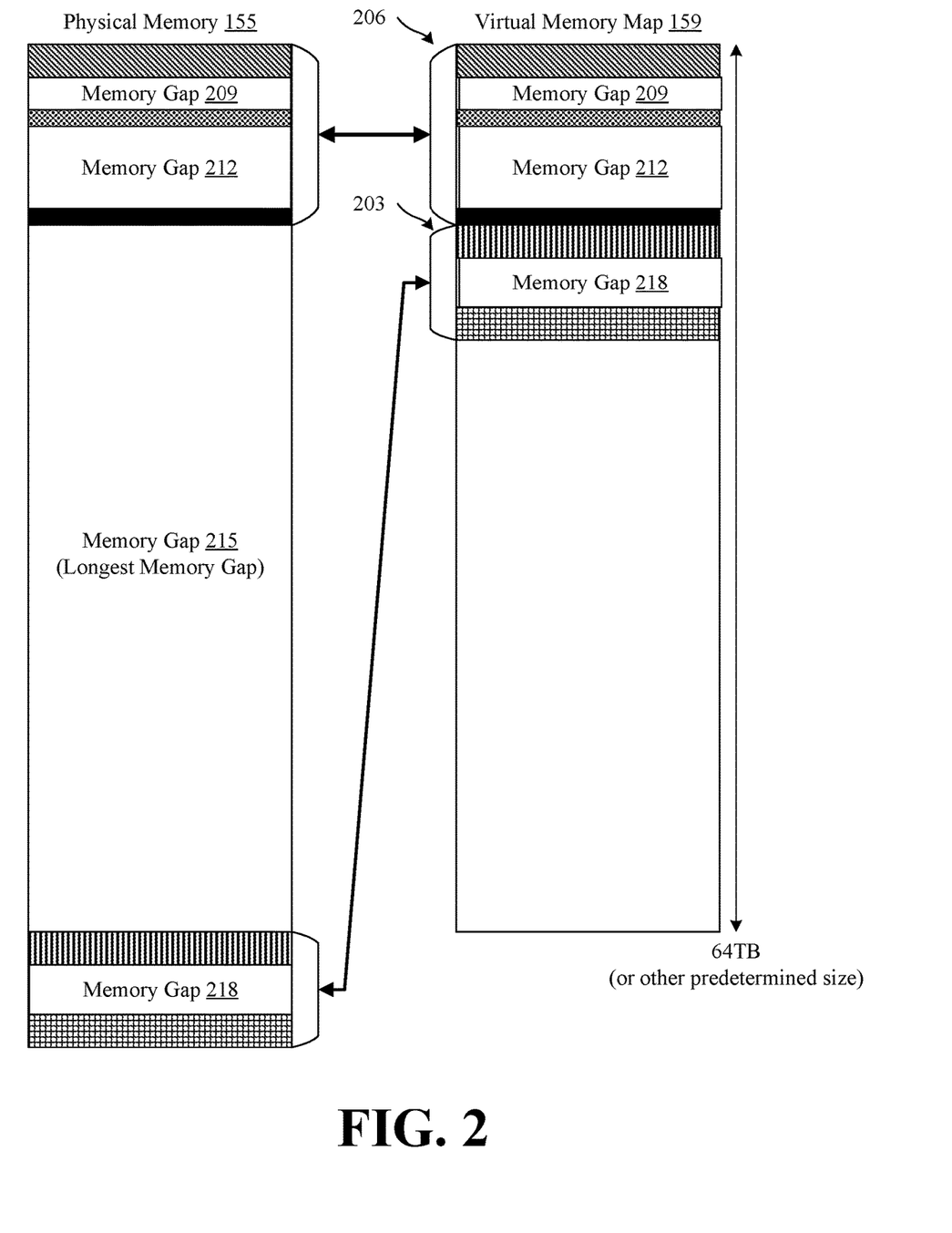
FIG. 2 is a drawing that provides an example of the operation of components of the networked environment of FIG. 1, according to the present disclosure.

FIG. 2 is a drawing that provides an example of the operation of components of the networked environment 100 to provide efficient bit compression for direct mapping of physical memory addresses. The drawing shows a physical memory 155 of a host device 106, as well as a virtual memory map 159. The virtual memory map 159 can map virtual machine memory to physical memory 155. Virtual machine memory can include memory that is allocated to a virtual machine and utilized for an enterprise workload 161.

Generally, the management hypervisor operating system 153 can include a component that performs bit compression to generate a virtual memory map 159 that is transformed to fit within a predetermined memory size associated with a kernel address space of the management hypervisor operating system 153 or another constraint. In this example, the predetermined memory size is indicated to be 64 TB. However, another predetermined memory size can be used by the virtual memory map 159. The virtual memory map 159 can include a set of transformed memory entries 203. The virtual memory map 159 can include a set of unchanged memory entries 206.

The direct mapping function 157 can include a facility or component that quickly addresses physical memory 155 of a host device 106. This process can have low overhead in terms of memory overhead and access overhead. The direct mapping function 157 can perform a one to one or direct mapping of physical memory 155 addresses to virtual memory map 159 entries. Virtual memory map 159 entries can include direct mapping offsets that are used by the direct mapping function 157 to map virtual memory to physical memory 155 addresses.

In the physical memory 155 shown, the white space can indicate unused memory addresses for which no memory such as RAM is used. Space that is filled or hatched can indicate used memory addresses where RAM is used. As can be seen, the total number of addresses in the physical memory 155 for the host device 106, including used and unused addresses from the first or lowest address to the highest used address can be greater than the total predetermined memory size of 64 TB. For some systems such as x86 systems, this scenario can be unlikely (but still possible), since RAM starts at the lowest address 0, and is generally contiguous, with relatively small memory gaps allocated for other purposes.

However, in Advanced RISC Machine (ARM) systems, RAM ranges do not often fit within the predetermined memory size of 64 TB. For example, in ARM systems RAM is unrequired to start at address 0, and RAM ranges are not required to be consecutive. Also, some dual-socket ARM-based systems can allocate the second socket's RAM to start at 64 TB, or at another relatively large address, far from the first socket's RAM. While ARM systems are one use case, any host device 106 that includes memories addressed beyond a predetermined memory size can benefit from bit compression for direct mapping of physical memory 155 addresses.

While the number of used physical memory 155 addresses shown can fit within the predetermined memory size, there can be memory gaps 209, 212, 215, and 218 such that the total range of memory addresses is greater than the predetermined memory size. One way of dealing with this problem is to compress the mappings. This can maintain a fast and efficient interface that includes a one to one machine address (e.g., physical memory 155) to virtual address function. This process can also avoid additional lookups involving extra memory accesses. The direct mapping function 157 initialization code of the management hypervisor operating system 153 can detect one or more unused (zero) range of bits that are not covered by any of the mapped memory entries, and can remove these bits from the virtual address offset computed, shifting higher bits in its place.

The positions and lengths of the memory gaps or unused bit strings can then be communicated to other components of the management hypervisor operating system 153 as stored arguments. The unused bits are calculated by computing a mask that indicates every system and firmware memory map entry that corresponds to used RAM entries, and performing a logical OR operation to the boundary or end addresses of these used memory entries. This process can be performed at boot time. The direct mapping function 157 initialization code can be a component that communicates with and works in concert with the management hypervisor operating system 153. Although in some examples the initialization code can include a separate executable, it can nevertheless be considered a component of the management hypervisor operating system 153.

The memory gaps 209, 212, 215, and 218 can be identified. In this example, however, only the longest memory gap 215 is removed. Preforming fewer shifts can increase speed and efficiency of the process, and can reduce the need to maintain a list of multiple memory gaps. As a result, the virtual memory map 159 can include a set of unchanged memory entries 206 that correspond to physical memory 155 addresses lower or lesser than a lowest end address of the memory gap 215. The smaller memory gaps 209 and 212 that are lesser in length than the length of the longest memory gap 215 are maintained, and are not removed or shifted within the set of unchanged memory entries 206.

The virtual memory map 159 can also include a set of transformed memory entries 203 that correspond to physical memory 155 addresses higher or greater than a highest end address of the memory gap 215. The smaller memory gap 218 that is lesser in length than the length of the longest memory gap 215 is not removed, but it is shifted within the set of transformed memory entries 203. As can be seen, the resulting set of entries in the virtual memory map 159 fits within the predetermined memory size of 64 TB.

In some examples, the components of the management hypervisor operating system 153 can determine whether a single memory gap will cause the virtual memory map 159 to fit within the predetermined memory size by calculating a total range from a lowest used memory address to a highest used memory address in the mask and subtracting the length of the longest memory gap 215. If so, then the process can proceed. If not, then the process can identify a next-longest memory gap, and determine whether removal of that memory gap will cause the virtual memory map 159 to fit within the predetermined memory size, and so on. In other words, some examples can remove a minimum number of identified memory gaps that enable the virtual memory map 159 to fit within the predetermined memory size. This can minimize memory accesses and maximize efficiency and simplicity for a given system.

Figure 3:
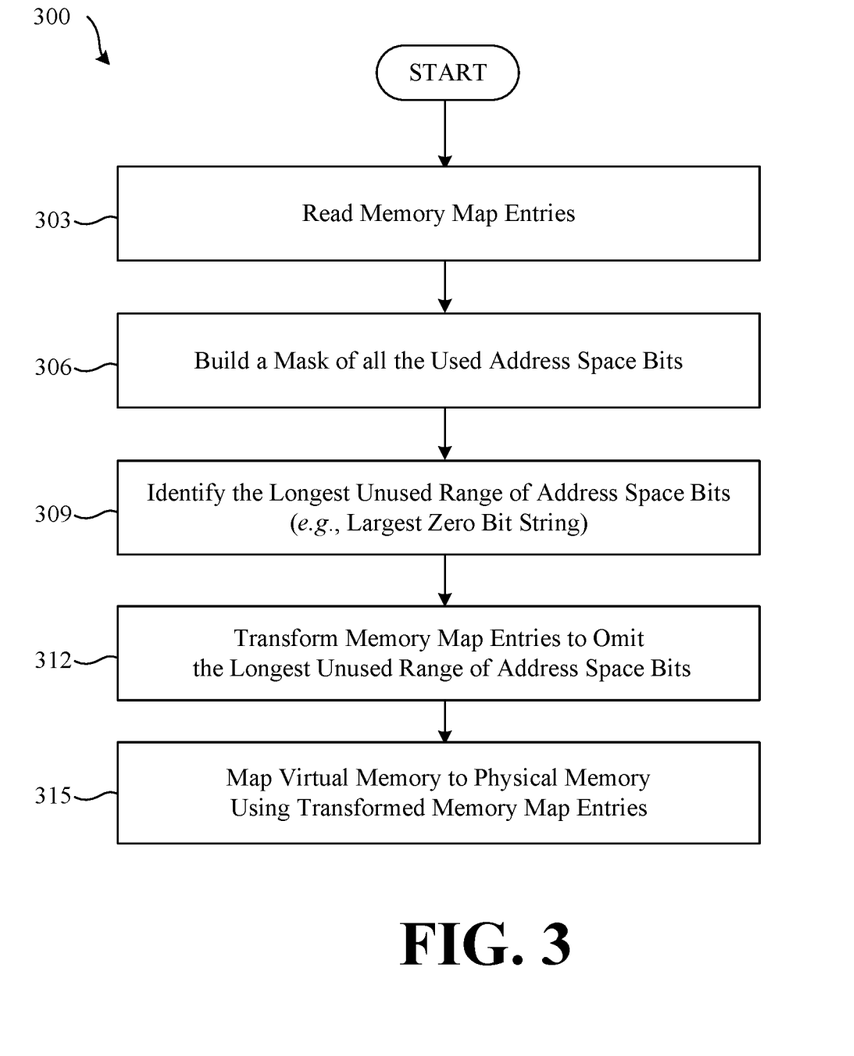
FIG. 3 is a flowchart illustrating functionality implemented by components of the networked environment, according to the present disclosure.

FIG. 3 shows a flowchart 300 that provides an example of the operation of components of the networked environment 100 to provide efficient bit compression for direct mapping of physical memory 155 addresses. Generally, this figure shows how the components executed by the host device 106 can ensure that physical memory 155 addresses can fit within a virtual memory map 159 that has a predetermined memory size. While the actions are discussed in a particular order, many of the actions can be performed scrambled relative to the order discussed, concurrently, and with partial concurrency. While actions can be discussed as performed by a particular component, certain aspects of the flowchart 300 can be performed by other components of the networked environment 100.

In step 303, the management hypervisor operating system 153 can read or otherwise identify memory map entries for the host device 106. The memory map entries that are identified can be the system and firmware memory map entries that correspond to RAM to be mapped using the direct mapping function 157. A component of the management hypervisor operating system 153 can include initialization code for the direct mapping function 157. The initialization code can execute at boot time.

In step 306, the management hypervisor operating system 153 can build or generate a mask of used address space bits indicated by the memory map entries. The management hypervisor operating system 153 can then build a mask that indicates all non-zero (i.e., used) memory map entries or memory addresses. This mask of used address space bits can include boundary or end addresses. The management hypervisor operating system 153 can identify the highest and lowest address of each range of used address space bits indicated in the mask.

In step 309, the management hypervisor operating system 153 can identify a longest range of unused address space bits. The management hypervisor operating system 153 can compute or identify the lengths of the ranges of unused address space bits. The management hypervisor operating system 153 can compare the lengths to identify the longest range of unused address space bits. A range of unused space can also be called a memory gap, and a longest unused space can be a longest memory gap.

The management hypervisor operating system 153 can identify one or more memory gaps using the mask of used address space bits. A length of a memory gap can be calculated using the highest and lowest address of each range of used address space bits indicated in the mask. A memory gap can include a range between: (1) a highest address of a first range of used address space bits indicated in the mask, (2) a lowest address of a higher (e.g., next-highest) range of used address space bits indicated in the mask. The memory gap does not include the highest address or the lowest address. Rather, the memory gap starts at the next higher address from the highest address of the first used range and ends at the next lower address from the higher used range.

In some examples, the management hypervisor operating system 153 can increment a length counter for each unused entry after the first range of used address space bits, and stop incrementing once a nonzero value is identified. The length counter can be saved as a longest memory gap variable that indicates a longest unused range of values. A position of the memory gap can also be saved as a longest memory gap position variable. The next memory gap can be similarly calculated by incrementing the length counter for another unused range. If the new length counter is greater than the previous longest memory gap variable, then the length counter can be saved as an updated longest memory gap variable. The position of the memory gap can also be updated to indicate the position of the updated longest memory gap. Otherwise, a next memory gap length can be identified and compared until all gaps are considered.

The positions and lengths of the memory gaps or unused bit strings can then be communicated to other components of the management hypervisor operating system 153 as stored arguments. The unused bits are calculated by computing a mask that indicates every system and firmware memory map entry that corresponds to used RAM entries, and performing a logical OR operation to the boundary or end addresses of these used memory entries. This process can be performed at boot time. The direct mapping function 157 initialization code can be a component that communicates with and works in concert with the management hypervisor operating system 153. Although in some examples the initialization code can include a separate executable, it can nevertheless be considered a component of the management hypervisor operating system 153.

In step 312, the management hypervisor operating system 153 can transform the memory map entries to omit the longest memory gap or unused range of address space bits. In other words, the management hypervisor operating system 153 can remove the longest memory gap, and can shift higher memory map entries in place of the longest memory gap. Bit addresses for higher memory map entries can be shifted lower by a length of the longest memory gap. The longest memory gap can be quite large, and can be larger than the total number of used bits. As a result, the resulting transformed memory map entries can fit within the predetermined memory size and can be used for the virtual memory map 159. The transformed memory map entries be converted into or used for direct mapping offsets for the direct mapping function 157.

In step 315, the management hypervisor operating system 153 can map a virtual memory for an enterprise workload 161 to physical memory 155 using the transformed memory map entries. The management hypervisor operating system 153 can use the virtual memory map 159 and the direct mapping function 157 to map the virtual memory to physical memory 155.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles Therefore, the following is claimed:

1. A non-transitory computer-readable medium comprising executable instructions, wherein the instructions, when executed by at least one processor, cause a computing device to at least:
- read, by a hypervisor operating system component of a hypervisor of the computing device, memory map entries of at least one physical memory of the computing device;
- generate, by the hypervisor operating system component, a mask of used address space bits indicated by the memory map entries;
- identify, by the hypervisor operating system component, a longest range of unused address space bits of at least one range of unused address space bits based at least in part on the mask of used address space bits;
- transform, by the hypervisor operating system component, the memory map entries into transformed memory map entries that omit the longest range of unused address space bits; and
- access, by a workload executed by the computing device, the at least one physical memory based at least in part on a direct mapping function that maps at least one virtual memory to the at least one physical memory using the transformed memory map entries.

2. The non-transitory computer-readable medium of claim 1, wherein the memory map entries are transformed into the transformed memory map entries by instructions that shift bit addresses that are higher than an end address of the longest range of unused address space bits, wherein the bit addresses are shifted lower by a length of the longest range of unused address space bits.

3. The non-transitory computer-readable medium of claim 1, wherein the mask of used address space bits comprises a subset of the memory map entries corresponding to random access memory to be mapped using the direct mapping function.

4. The non-transitory computer-readable medium of claim 3, wherein the mask of used address space bits is generated based at least in part on performing a logical OR operation to end addresses of the subset of the memory map entries.

5. The non-transitory computer-readable medium of claim 1, wherein the transformed memory map entries correspond to a plurality of direct mapping offsets for the direct mapping function.

6. The non-transitory computer-readable medium of claim 1, wherein the direct mapping function maintains a one-to-one mapping of the at least one virtual memory to the at least one physical memory.

7. The non-transitory computer-readable medium of claim 1, wherein the hypervisor operating system component comprises initialization code for the direct mapping function.

8. A system, comprising:
- a computing device comprising at least one processor; and
- a data store comprising executable instructions, wherein the instructions, when executed by the at least one processor, cause the computing device to at least:
  - read, by a hypervisor operating system component of a hypervisor of the at least one computing device, memory map entries of at least one physical memory of the computing device;
  - generate, by the hypervisor operating system component, a mask of used address space bits indicated by the memory map entries;
  - identify, by the hypervisor operating system component, a longest range of unused address space bits of at least one range of unused address space bits based at least in part on the mask of used address space bits;
  - transform, by the hypervisor operating system component, the memory map entries into transformed memory map entries that omit the longest range of unused address space bits; and
  - access, by a workload executed by the computing device, the at least one physical memory based at least in part on a direct mapping function that maps at least one virtual memory to the at least one physical memory using the transformed memory map entries.

9. The system of claim 8, wherein the memory map entries are transformed into the transformed memory map entries by instructions that shift bit addresses that are higher than an end address of the longest range of unused address space bits, wherein the bit addresses are shifted lower by a length of the longest range of unused address space bits.

10. The system of claim 8, wherein the mask of used address space bits comprises a subset of the memory map entries corresponding to random access memory to be mapped using the direct mapping function.

11. The system of claim 10, wherein the mask of used address space bits is generated based at least in part on performing a logical OR operation to end addresses of the subset of the memory map entries.

12. The system of claim 8, wherein the transformed memory map entries correspond to a plurality of direct mapping offsets for the direct mapping function.

13. The system of claim 8, wherein the direct mapping function maintains a one-to-one mapping of the at least one virtual memory to the at least one physical memory.

14. The system of claim 8, wherein the hypervisor operating system component comprises initialization code for the direct mapping function.

15. A method, comprising:
- reading, by a hypervisor operating system component of a hypervisor of a computing device, memory map entries of at least one physical memory of the computing device;
- generating, by the hypervisor operating system component, a mask of used address space bits indicated by the memory map entries;
- identifying, by the hypervisor operating system component, a longest range of unused address space bits of at least one range of unused address space bits based at least in part on the mask of used address space bits;
- transforming, by the hypervisor operating system component, the memory map entries into transformed memory map entries that omit the longest range of unused address space bits; and
- accessing, by a workload executed by the computing device, the at least one physical memory based at least in part on a direct mapping function that maps at least one virtual memory to the at least one physical memory using the transformed memory map entries.

16. The method of claim 15, wherein the memory map entries are transformed into the transformed memory map entries by instructions that shift bit addresses that are higher than an end address of the longest range of unused address space bits, wherein the bit addresses are shifted lower by a length of the longest range of unused address space bits.

17. The method of claim 15, wherein the mask of used address space bits comprises a subset of the memory map entries corresponding to random access memory to be mapped using the direct mapping function.

18. The method of claim 17, wherein the mask of used address space bits is generated based at least in part on performing a logical OR operation to end addresses of the subset of the memory map entries.

19. The method of claim 15, wherein the transformed memory map entries correspond to a plurality of direct mapping offsets for the direct mapping function.

20. The method of claim 15, wherein the direct mapping function maintains a one-to-one mapping of the at least one virtual memory to the at least one physical memory.

* * * * *